(12) United States Patent
Deolarte et al.

(10) Patent No.: US 8,481,098 B2
(45) Date of Patent: Jul. 9, 2013

(54) DEVICE AND PROCESS FOR THE PREPARATION OF A BEVERAGE WITH ENHANCED AROMA

(75) Inventors: Francisco Deolarte, Paris (FR); Juan J. Gonzalez, St. Legier (CH)

(73) Assignee: Nestec S.A., Vevey (CH)

( * ) Notice: Subject to any disclaimer, the term of this patent is extended or adjusted under 35 U.S.C. 154(b) by 141 days.

(21) Appl. No.: 12/995,863

(22) PCT Filed: Jun. 2, 2009

(86) PCT No.: PCT/EP2009/056747
§ 371 (c)(1),
(2), (4) Date: Dec. 2, 2010

(87) PCT Pub. No.: WO2009/147142
PCT Pub. Date: Dec. 10, 2009

(65) Prior Publication Data
US 2011/0076371 A1    Mar. 31, 2011

(30) Foreign Application Priority Data
Jun. 3, 2008    (EP) ..................................... 08157497

(51) Int. Cl.
*A23F 5/26*    (2006.01)
(52) U.S. Cl.
USPC ........................................... 426/433; 99/287

(58) Field of Classification Search
USPC ............................................. 426/433; 99/287
See application file for complete search history.

(56) References Cited

U.S. PATENT DOCUMENTS

| | | | |
|---|---|---|---|
| 2,452,933 A | 11/1943 | Joppich et al. | |
| 3,739,709 A | 6/1973 | Wagner et al. | |
| 5,154,111 A | 10/1992 | Luciano | |

FOREIGN PATENT DOCUMENTS

| | | |
|---|---|---|
| GB | 1067549 | 5/1967 |
| WO | WO 2004/014781 | 2/2004 |

OTHER PUBLICATIONS

International Search Report for International Application No. PCT/EP2009/056747 mailed on Aug. 5, 2009.
Written Opinion for International Application No. PCT/EP2009/056747 mailed on Aug. 5, 2009.

*Primary Examiner* — Anthony Weier
(74) *Attorney, Agent, or Firm* — K&L Gates LLP

(57) ABSTRACT

The present invention relates to a device for the preparation of a beverage having: a mixing chamber (1) for mixing a soluble ingredient (2) and a diluent, the chamber further having a top opening (4), a diluent inlet opening (5), a beverage outlet opening (6), sealing item (7) that is able to seal the top opening (4) of the mixing chamber (1) and to prevent any fluid from leaving the mixing chamber through said sealing item. The invention also relates to a method for using this device.

12 Claims, 5 Drawing Sheets

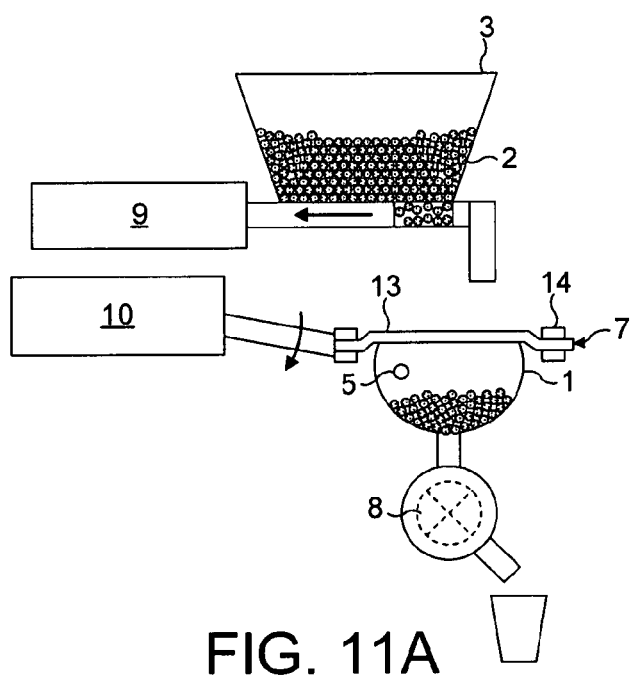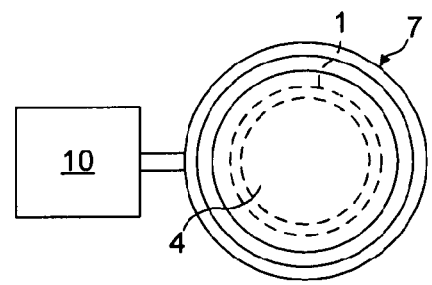
FIG. 11A
FIG. 11B

DEVICE AND PROCESS FOR THE PREPARATION OF A BEVERAGE WITH ENHANCED AROMA

The present invention concerns a device for preparing a beverage with enhanced aroma.

Many beverages like espresso and other coffee drinks, milk drinks, soups, . . . are often prepared by mixing a food soluble powder or a food liquid concentrate with a diluent. Mixing devices are known for speedier preparation of such beverages by mixing the soluble food component with the diluent, such as hot water. These devices typically comprise a mixing chamber in which the soluble component and the diluent are fed. The diluent is usually introduced into the mixing chamber in order to create a whirlpool to efficiently dissolve the soluble component in the water. The mixture is then usually evacuated from the mixing chamber through the bottom of the mixing chamber and dispensed into a receptacle for drinking.

The object of the present invention is to improve such mixing devices in order to provide beverages presenting higher aroma properties when they are delivered in the receptacle.

U.S. Pat. No. 5,514,111 describes a device for obtaining hot drinks in solution, especially cappuccino from a mixture of coffee in granules, milk and steam. The coffee granules are dispensed in a predetermined dose into a treatment chamber. The treatment chamber is closed by a cover and then air, liquid and steam are injected into the treatment chamber. The granules are mixed and dissolved in the liquid in the presence of steam and air. The beverage is removed from the treatment chamber in a first time through an outlet inside the cover of the treatment chamber and in a second time through a valve in the bottom of the treatment chamber. Yet the operation of such a device is complex due to the dual evacuation of the beverage through the cover and through the bottom.

There is a need for a simpler and low cost solution enabling to dissolve a concentrate and produce a beverage from the combination of a diluent and soluble ingredient or liquid concentrate and avoiding the aromas generated during the dissolution to escape.

The invention is firstly based on a device for the preparation of a beverage comprising:
  a mixing chamber for mixing a soluble ingredient and a diluent, said chamber comprising:
    a top opening,
    a diluent inlet opening,
    a beverage outlet opening,
  sealing means, said sealing means being able to seal the top opening of the mixing chamber and to prevent any fluid from leaving the mixing chamber through said sealing means.

The mixing chamber of the device can be of any known kind and can take various shapes. In a preferred mode, the longitudinal upward wall is substantially cylindrical. Other shapes could be envisaged such as a polygonal, e.g., hexagonal, or oval section of the chamber, for instance. The bottom wall can be substantially a portion of truncated cone. The mixing chamber presents a top opening that is usually used for the introduction of soluble ingredient that can be introduced by gravimetric fall inside the mixing chamber. The mixing chamber also comprises a diluent inlet opening. Said diluent inlet opening is preferably in a side wall of the mixing chamber. The mixing chamber comprises a beverage outlet opening for delivering the beverage issued from the dissolution of soluble ingredient with the diluent inside the mixing chamber. Said beverage outlet of the mixing chamber is preferably in the bottom wall of the mixing chamber.

According to the invention, the device comprises sealing means that are able to seal the top opening of the mixing chamber and to prevent any fluid from leaving the mixing chamber through said sealing means or through the connection between the sealing means and the mixing chamber edges. These sealing means are preferably a cover. It means that the cover is preferably made of one full piece without presenting any aperture and that said cover, once placed above the top opening of the mixing chamber hermetically enters into contact with the mixing chamber top opening without leaving any aperture between the cover and the edge (s) of the mixing chamber top opening. The connection between the sealing means and the mixing chamber top opening is an hermetic seal. No fluid, either liquid or gaseous, can enter in or leave the chamber once the sealing means seal the mixing chamber top opening.

Once the sealing means seal the top opening of the mixing chamber the only opened outlet of the mixing chamber is the beverage outlet.

The sealing of the mixing chamber top opening can be realised according to different modes: generally the sealing means are a cover and said cover and the mixing chamber are able to move relative to each other so that in a first position the top opening of the mixing chamber is opened and in a second position the cover closes the top opening of the mixing chamber. According to a first mode, the cover is fixed and the mixing chamber is able to move between two positions in order to be sealed or not by the cover. According to a second preferred mode, the cover is displaceable. The cover can be linearly and/or rotationally moveable, from one position to the other while the mixing chamber is fixed. According to this second mode, the cover is linearly and/or rotationally moveable from a position where it covers the mixing chamber top opening to a position where it leaves the mixing chamber top opening uncovered.

The cover is preferably composed of a soft material. By soft, it is meant that the material is sufficiently elastic to establish a tight contact with the mixing chamber top opening in order to hermetically seal it when it is pushed against it. The soft material can be chosen between at least one of the following materials: Plasmol®, silicone, elastomer, rubber, preferably a thermoplastic rubber or elastomer (TPE). Actually a TPE polymer is a polymer blend or compound which, above its melt temperature, exhibits a thermoplastic character that enables it to be shaped into a fabricated article and which, within its design temperature range, possesses elastomeric behaviour. The interest of using a cover made of a deformable soft material is that this material can efficiently stick to the edges of the mixing chamber top opening during the beverage preparation: in particular, during the evacuation of the beverage from the mixing chamber, a depression occurs inside the mixing chamber that induces the sucking and the deformation of the soft cover improving its sealing function.

Apart from the soft part, the cover can also comprise a rigid material part for supporting the soft material. According to the preferred embodiment of the present invention, the soft material is hold between two frames of rigid material. Then, the frames of rigid material can be linked to a motor to control the movement of the assembly of the frames and of the soft material. The rigid material can be chosen between at least one of the following materials: HDPE (high density polyethylene), LDPE (low density polyethylene), POM (polyoxymethylene), PP (polypropylene), nylon, metal, polycarbonate. This rigid part of the cover is useful to enable the displacement of the cover on and out of the mixing chamber top opening particularly if the second mode is implemented, for example a mechanism for moving the cover can be fixed on the rigid material, the latter supporting the soft material of the cover.

In a preferred embodiment of the present invention, the mixing chamber can be connected to a fan able to suck or to flow back gaseous fluids present inside the mixing chamber. The connection between the fan and the mixing chamber can be a pipe that opens in the mixing chamber side wall.

The device of the present invention usually also comprises a metering device able to deliver a soluble ingredient dose through the top opening of the mixing chamber when the latter is opened. The metering device can comprise dosing means which can be of any known types like a screw, an auger, a barrel, a sliding chamber, a rotary pierced disc, . . . for delivering a dose of powder to the mixing chamber of the apparatus or a pump like a peristaltic pump if the soluble ingredient is a liquid. The outlet of the metering device is directed to or cooperates with the mixing chamber top opening—e.g. through a pipe—when the cover does not seal the opening.

The device can comprise a whipping chamber, said whipping chamber being connected to the mixing chamber beverage outlet. The whipping chamber can help in the dissolution if the soluble ingredient is difficult to dissolve by only a simple contact with the diluent or if the beverage needs to be foamed.

The invention is secondly based on a method for preparing a beverage with a device as described above comprising at least the following steps:
 introducing a soluble ingredient inside the mixing chamber through the top opening of the mixing chamber,
 closing the top opening of the mixing chamber with the sealing means,
 introducing a diluent inside the chamber so that it mixes with the soluble ingredient,
 evacuating the mixed product from the mixing chamber through the beverage outlet opening,
 opening the top opening of the mixing chamber.

Preferably, the top opening of the mixing chamber is opened once the mixed product has been totally evacuated from the mixing chamber.

According to the preferred mode, the closure of the mixing chamber is realised by moving the cover to the mixing chamber top opening and the mixing chamber is opened by moving the cover away from the mixing chamber top opening.

If the device comprises a whipping chamber connected to the mixing chamber outlet, then during the evacuation of the mixed product the mixed product can be whipped and the depression due to the evacuation of the beverage from the mixing chamber is increased. This depression helps in sucking the aromas and delivering them with the beverage in the final receptacle.

If the device comprises a fan connected to the inside of the mixing chamber, said fan can suck gaseous fluids from the mixing chamber when the mixing chamber is opened and said fan can also flow back gaseous fluids from the mixing chamber to the beverage outlet opening of the mixing chamber when the mixing chamber is closed. When the sealing means are opened sucking operation enables the elimination of humidity like steam above the mixing chamber and avoids said humidity to enter inside the metering device generally placed above the mixing chamber particularly for powder soluble products. When the sealing means close the mixing chamber, flowing back operation enables an improved recovery of the aromas in the final receptacle.

According to a preferred embodiment of the process of the present invention, during the closure of the top opening of the mixing chamber with the sealing means, the sealing means are first brought above the top opening and secondly moved vertically to enter in contact with the top opening and close it. The movement for bringing the sealing means above the top opening can be a rotational or translation movement.

The device and the method of the present invention enable the production of beverage, especially coffee beverage, presenting enhanced in-cup aroma by directing most of the steam and vapors produced during the mixing operation into the final cup, in particular compounds like sulphur compounds and aldehydes that are representative of coffee aroma and that are more perceptible by the consumer.

Embodiments of the invention are described in more with reference to the accompanying drawings, wherein:

FIG. 1 depicts a device according to the present invention in its stand-by state.

FIGS. 2 to 6 schematically depict the preparation of a beverage according to the present invention by the means of said device.

Figure 1:
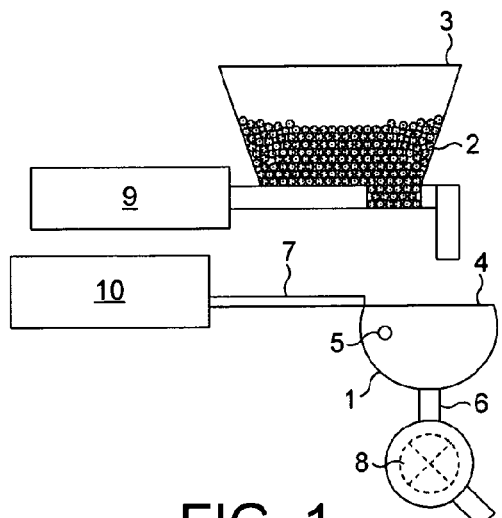

FIGS. 9A to 11B schematically depict the preparation of a beverage according to the preferred embodiment of the present invention.

It should be understood that the figures are merely schematic and are not drawn to scale. It should also be understood that the same reference numerals are used throughout the Figures to indicate the same or similar parts.

FIG. 1 depicts a device for preparing beverages comprising a mixing chamber 1 presenting a top opening 4, a diluent inlet 5 and a beverage outlet opening 6. The device also comprises a metering device 3 comprising a hopper full of soluble ingredient like coffee powder 2 and a motor 9 to activate the introduction of a soluble ingredient dose inside the mixing chamber 1 trough its top opening 4. The device comprises a cover 7 that can slide above and away from the top opening 4 of the mixing chamber 1 further to the action of a motor 10. The beverage outlet opening 6 opens in a whipping chamber 8 comprising a whipper to help in the dissolution the foaming of the beverage. FIG. 1 corresponds to the stand-by step of the device of the invention: the metering device 3 is not activated, the mixing chamber top opening 4 is opened and no diluent is introduced in the mixing chamber 1.

Figure 2:
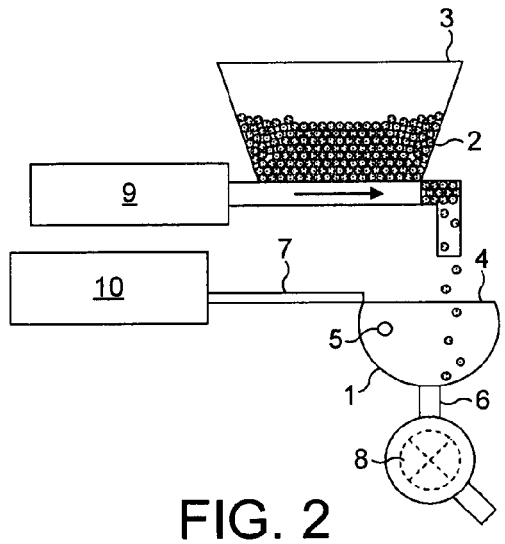

FIG. 2 illustrates the dosing step of the preparation of a beverage with the device of the present invention: the motor 9 of the metering device 3 pushes a dose of soluble ingredient 2 in the mixing chamber top opening 4.

Figure 3:
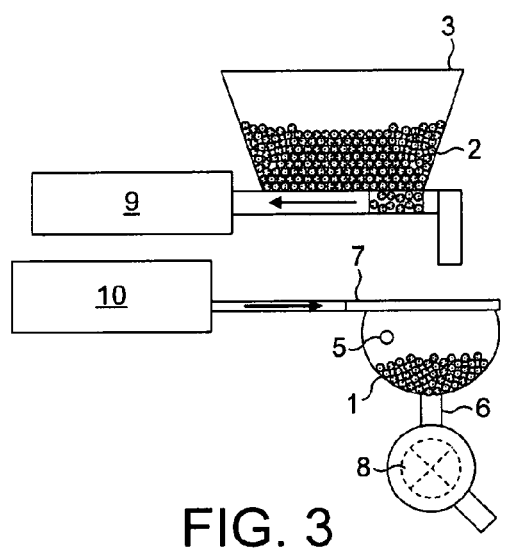

FIG. 3 illustrates the mixing chamber sealing step: the motor 9 of the metering device has been put off. The motor 10 for moving the cover 7 is activated in order to close the mixing chamber top opening 4.

Figure 4:
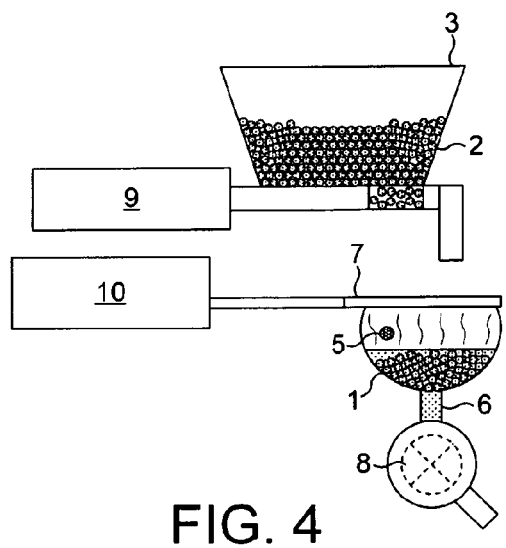

FIG. 4 illustrates the dissolution step: the diluent is introduced through the inlet 5 inside the mixing chamber to dissolve the soluble ingredient. The dissolved ingredient escapes from the mixing chamber 1 through the outlet 6.

Figure 5:
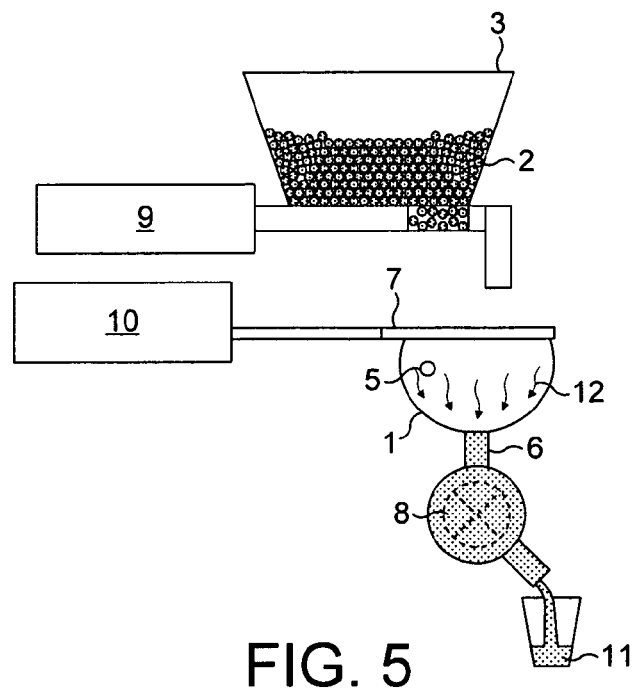

FIG. 5 illustrates the delivery step: the dissolved ingredient is eventually whipped in the whipping chamber 8 and delivered in a receptacle 11. Due to the closure of the mixing chamber 1 by the cover 7 and the depression induced by the evacuation of the beverage in the receptacle 11 and eventually by the operation of the whipper, the aromas 12 of the beverage that are still inside the mixing chamber are sucked with the beverage flow.

Figure 6:
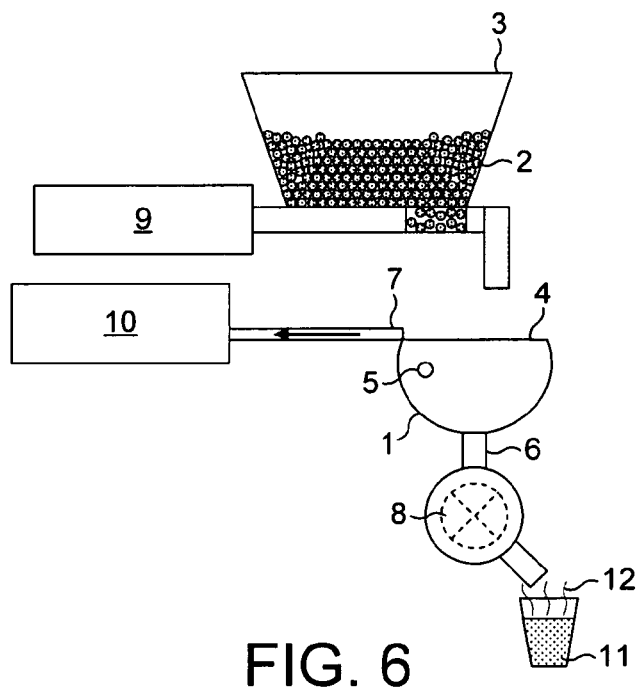

FIG. 6 illustrates the mixing chamber opening step: once the beverage has been totally evacuates in the receptacle, then the motor 10 of the cover is activated to move the cover 7 away from the mixing chamber top opening 4 in order to come back to the stand-by step as illustrated in FIG. 1.

Figure 7:
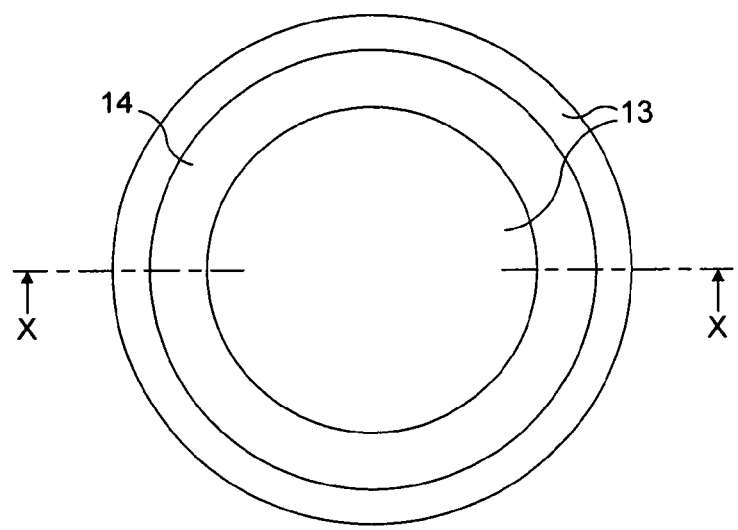
FIG. 7 is a top view of the preferred embodiment of the sealing means.
Figure 8:
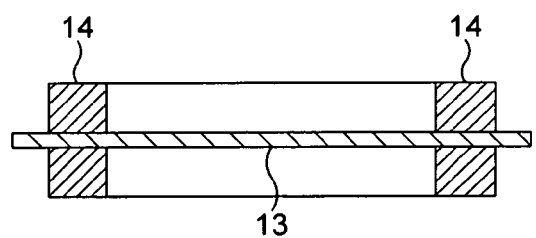
FIG. 8 is a section view of the sealing means of FIG. 7 according to XX'.

FIGS. 7 and 8 is depicts sealing means according to the preferred embodiment of the present invention. Said sealing means are composed of a soft part 13 which is a disc of soft material and of a rigid part 14 which is made of two rings of a rigid material encircling the disc of soft material to hold it.

Figure 9A:
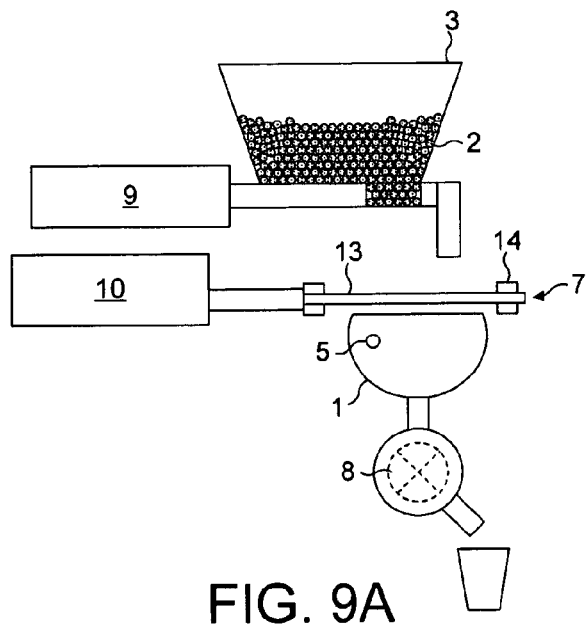
Figure 9B:
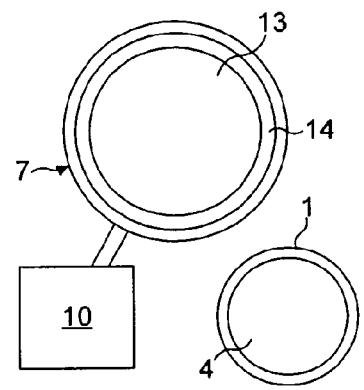
Figure 10A:
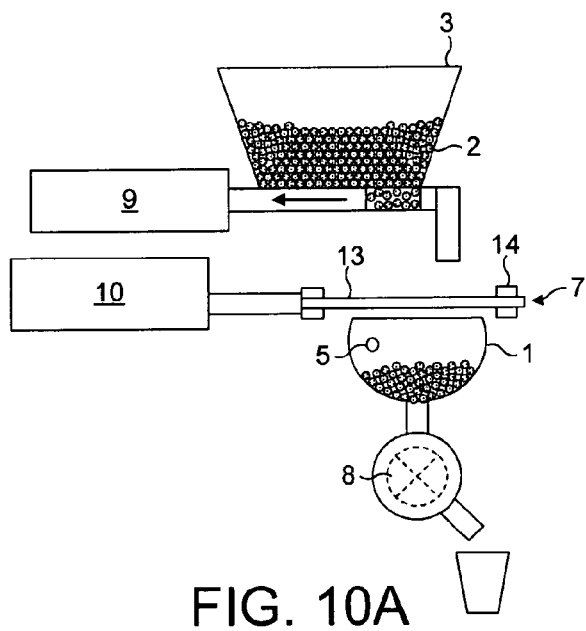
Figure 10B:
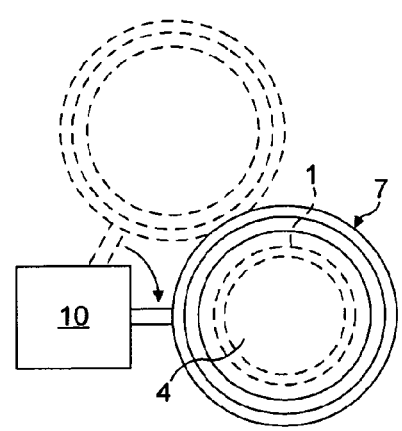

FIG. 9A depicts a device for preparing beverages as described in FIG. 1 except that the sealing means 7 correspond to the embodiment defined in FIGS. 7 and 8. FIG. 9B is a top view of the device of FIG. 9A representing the relative positions of the sealing means 7 and of the mixing chamber top opening 4. In this stand-by position of the device, the sealing means 7 are placed away from the mixing chamber top opening 4 so as to let this opening free for the next step of introduction of a soluble ingredient dose inside the mixing chamber 1.

FIGS. 10A, 10B, 11A and 11B depict the movement of the sealing means of the device of FIG. 9A during the mixing chamber sealing step (equivalent to FIG. 3 step). The sealing step implements two movements of the sealing means 7: first the sealing means are rotated by motor 10 so that they are brought above the mixing chamber top opening 4 (FIGS. 10A and 10B) and then the sealing means are moved downward by motor 10 so that the soft material part 13 of the cover stick to the edge of the mixing chamber and hermetically close it. The inner surface defined by the two rings 14 of rigid material of the sealing means 7 is designed as to be greater than the outer diameter of the mixing chamber top opening 4 so that the soft part 13 of the sealing means can easily cover the whole top opening 4 and contact all the top opening edges.

EXAMPLE

Coffee beverages were prepared using either a coffee machine integrating a device according to the present invention and according to the method of the present invention or with a coffee machine of the state of the art.

The both coffee machines were identical except that the coffee machine according to the present invention included a cover for the mixing chamber and a mechanism to close the mixing chamber once the coffee powder was introduced inside the mixing chamber and before the diluent was introduced inside the mixing chamber. The cover was not removed from the mixing chamber opening before the beverage was totally evacuated from the mixing chamber. The cover was made of one full piece and its connection with the mixing chamber was hermetic from the step of the introduction of the diluent until the complete evacuation of the coffee from the mixing chamber inside the receptacle. The coffee machine did not present any cover above the mixing chamber.

The coffee preparation consisted in both cases in introducing 1.25 g of the same soluble coffee powder inside the mixing chamber and dissolving it with 23 ml of hot water. Immediately after the coffee beverage had dropped inside the receptacle, the receptacle was hermetically closed and is cooled in cold water. Before the coffee preparation, deuterium or C-13 were added in the bottom of the receptacle to quantify the aroma compounds and cysteine was added to release matrix bound thiols.

The aromas of the coffee beverage inside the receptacle were analysed by combined solid phase micro-extraction and gas chromatography. The results are presented in Table 1.

TABLE 1

| Aroma nature | Aroma concentration (ppm/dry matter) | | Increase of aroma concentration (%) |
|---|---|---|---|
| | Prior art | Invention | |
| methanethiol | 0.82 | 1.45 | 175% |
| dimethyl sulfide | 0.80 | 1.39 | 174% |
| furfurylthiol | 2.05 | 3.20 | 156% |
| 3-mercapto-3-methylbutylformate | 0.46 | 0.49 | 107% |
| sulfur compounds | 4.13 | 6.53 | 158% |
| acetaldehyde | 620.39 | 776.69 | 125% |
| 2-methylpropanal | 1.00 | 1.84 | 184% |
| 3-methylbutanal | 9.33 | 12.48 | 134% |
| aldehydes | 630.72 | 791.01 | 125% |
| N-methylpyrrole | 20.93 | 22.68 | 108% |
| 2,3-pentanedione | 0.68 | 0.98 | 143% |
| diketones | 0.68 | 0.98 | 143% |
| 2-3-5-trimethylpyrazine | 4.42 | 4.58 | 104% |
| pyrazines | 4.42 | 4.58 | 104% |
| high volatiles aroma compounds (methanethiol + dimethyl sulfide + 2-methylpropanal + 3-methylbutanal) | 11.95 | 17.15 | 144% |
| medium volatiles aroma compounds (3-mercapto-3-methylbutylformate + acetaldehyde + N-methylpyrrole + 2,3-pentanedione) | 642.46 | 800.85 | 125% |

The results of Table 1 show that significant higher contents of key sulphur compounds and aldehydes, that are known to contribute significantly to the coffeeness, are obtained with the coffee machine implementing a cover on the mixing chamber according to the present invention.

The invention claimed is:

1. Device for the preparation of a beverage comprising:
a mixing chamber for mixing a soluble ingredient and a diluent, the chamber comprising:
a top opening,
a diluent inlet opening,
a beverage outlet opening,
a sealing member, the sealing member being able to seal the top opening of the mixing chamber and prevent any fluid from leaving the mixing chamber through the sealing member wherein, the sealing member comprising a cover that is able to move relative to the mixing chamber such that in a first position the top opening of the mixing chamber is opened and in a second position the cover closes the top opening of the mixing chamber, and the cover comprising a rigid material part and at least one soft material part wherein the at least one soft material part is of a material and positioned such that the at least one soft material part efficiently sticks to the edges of the top opening of the mixing chamber when the device is used to prepare a beverage, thus imparting sealing to the top opening of the mixing chamber, and wherein during evacuation of the beverage from the mixing chamber and induced sucking therein, the at least one soft material part deforms to improve its sealing function.

2. Device according to claim 1 wherein the cover is rotationally and/or linearly moveable from one position to the other.

3. Device according to claim 1, wherein the soft material is selected from the group consisting of: Plasmol®, silicone, elastomer, rubber, a thermoplastic rubber and elastomer (TPE).

4. Device according to claim 1 wherein the rigid material part supports the soft material part.

5. Device according to claim 4 wherein the rigid material part comprises two frames of rigid material, and the soft material part is held between the two frames of rigid material.

6. Device according to claim 4 wherein the rigid material part is a material selected from the group consisting of: HDPE, LDPE, POM, PP, and nylon.

7. Device according to claim 4 comprising a mechanism for moving the cover that is fixed on the rigid material part.

8. A method for preparing a beverage comprising the steps:
providing a device comprising a mixing chamber for mixing a soluble ingredient and a diluent, the chamber comprising: a top opening, an inlet opening, an outlet opening, a sealing member that is able to seal the top opening of the mixing chamber and that is able to move relative to the mixing chamber such that in a first position the top opening of the mixing chamber is opened and in a second position the sealing member closes the top opening of the mixing chamber, and the sealing member comprising a rigid material part and at least one soft material part;
introducing a soluble ingredient inside the mixing chamber through the top opening of the mixing chamber,
closing the top opening of the mixing chamber with the sealing member,
imparting sealing to the top opening of the mixing chamber when the device is used to prepare a beverage, the at least one soft material part is of a material and positioned such that the at least one soft material part efficiently sticks to the edges of the top opening of the mixing chamber to impart to the sealing to the top opening of the mixing chamber,
introducing a diluent inside the mixing chamber so that it mixes with the soluble ingredient,
evacuating a mixed product from the mixing chamber through the beverage outlet opening, and during evacuation of the mixed product from the mixing chamber and sucking in the mixing chamber induced by the evacuation, the at least one soft material of the sealing member deforms to improve its sealing function, and
opening the top opening of the mixing chamber.

9. A method according to claim 8 wherein the top opening of the mixing chamber is opened once the mixed product is totally evacuated from the mixing chamber.

10. A method according to claim 8, wherein when the top opening is closed of the mixing chamber with the sealing member, the sealing member is first brought above the top opening and secondly moved vertically to enter into contact with the top opening and close it.

11. Device for the preparation of a beverage comprising:
a mixing chamber for mixing a soluble ingredient and a diluent, the mixing chamber comprising:
a top opening,
a diluent inlet opening,
a beverage outlet opening,
a sealing member, the sealing member being able to seal the top opening of the mixing chamber and prevent any fluid from leaving the mixing chamber through the sealing member wherein, the sealing member comprising a cover that is able to move relative to the mixing chamber such that in a first position the top opening of the mixing chamber is opened and in a second position the cover closes the top opening of the mixing chamber, and the cover comprising at least one soft material part, and the mixing chamber is connected to a fan that is able to suck back gaseous fluids from the mixing chamber when the mixing chamber is opened and the fan is able to cause gaseous fluids to flow back from the mixing chamber to the outlet opening of the mixing chamber when the mixing chamber is closed.

12. A method for preparing a beverage comprising the steps:
providing a device comprising a mixing chamber for mixing a soluble ingredient and a diluent, the chamber comprising: a top opening, an inlet opening, an outlet opening, a sealing member that is able to seal the top opening of the mixing chamber and that is able to move relative to the mixing chamber such that in a first position the top opening of the mixing chamber is opened and in a second position the sealing member closes the top opening of the mixing chamber, the device comprising a fan connected to the inside of the mixing chamber, the fan sucks gaseous fluids from the mixing chamber when the mixing chamber is opened and the fan causes gaseous fluids to flow back from the mixing chamber to the outlet opening of the mixing chamber when the mixing chamber is closed;
introducing a soluble ingredient inside the mixing chamber through the top opening of the mixing chamber,
closing the top opening of the mixing chamber with the sealing member,
introducing a diluent inside the mixing chamber so that it mixes with the soluble ingredient,
evacuating a mixed product from the mixing chamber through the beverage outlet opening, and
opening the top opening of the mixing chamber.

* * * * *